(12) United States Patent
Kutsovsky

(10) Patent No.: US 7,572,423 B2
(45) Date of Patent: Aug. 11, 2009

(54) FUMED METAL OXIDE PARTICLES AND PROCESS FOR PRODUCING THE SAME

(75) Inventor: Yakov E. Kutsovsky, Arlington, MA (US)

(73) Assignee: Cabot Corporation, Boston, MA (US)

( * ) Notice: Subject to any disclaimer, the term of this patent is extended or adjusted under 35 U.S.C. 154(b) by 68 days.

(21) Appl. No.: 10/720,582

(22) Filed: Nov. 24, 2003

(65) Prior Publication Data
US 2004/0156773 A1    Aug. 12, 2004

Related U.S. Application Data

(60) Provisional application No. 60/429,217, filed on Nov. 26, 2002.

(51) Int. Cl.
*C01B 33/12*    (2006.01)
(52) U.S. Cl. .................. 423/337; 423/592.1; 423/593.1; 423/600; 423/624; 423/625
(58) Field of Classification Search ................. 423/337, 423/592.1, 593.1, 600, 624, 625
See application file for complete search history.

(56) References Cited

U.S. PATENT DOCUMENTS

| | | |
|---|---|---|
| 2,631,083 A | 3/1953 | Engelson et al. |
| 2,693,406 A | 11/1954 | Wendell, Jr. et al. |
| 2,771,344 A | 11/1956 | Michel et al. |
| 2,773,741 A | 12/1956 | Antonsen |
| 2,780,525 A | 2/1957 | Wendell, Jr. et al. |
| 2,801,901 A | 8/1957 | Dingman et al. |
| 2,803,038 A | 8/1957 | Holland et al. |
| 2,828,186 A | 3/1958 | Dingman et al. |
| 2,829,949 A | 4/1958 | Wendell, Jr. et al. |
| 2,847,316 A | 8/1958 | Michel et al. |
| 3,006,738 A | 10/1961 | Wagner |
| 3,007,774 A | 11/1961 | Stokes et al. |
| 3,024,089 A | 3/1962 | Spencer et al. |

(Continued)

FOREIGN PATENT DOCUMENTS

DE    199 55 456 A1    5/2001

(Continued)

OTHER PUBLICATIONS

Briesen et al., "The effect of precursor in flame synthesis of $SiO_2$," *Chem. Eng. Sci.*, 53(24), 4105-4112 (1998).

(Continued)

*Primary Examiner*—Stanley Silverman
*Assistant Examiner*—Paul Wartalowicz

(57) ABSTRACT

The invention provides a process for producing fumed metal oxide particles comprising providing a stream of a liquid feedstock comprising a volatizable, non-halogenated metal oxide precursor, providing a stream of a combustion gas having a linear velocity sufficient to atomize and combust or pyrolyze the liquid feedstock, and injecting the stream of the liquid feedstock into the stream of combustion gas to form a reaction mixture such that the liquid feedstock is atomized and subjected to a sufficient temperature and residence time in the combination gas stream for fumed metal oxide particles to form before the combustion gas temperature is reduced below the solidifying temperature of the metal oxide particle. The invention further provides fumed silica particles having a relatively small aggregate size and/or narrow aggregate size distribution.

30 Claims, 1 Drawing Sheet

U.S. PATENT DOCUMENTS

| | | | |
|---|---|---|---|
| 3,065,093 A | 11/1962 | Berstein et al. | |
| 3,112,210 A | 11/1963 | Carpenter et al. | |
| 3,130,008 A | 4/1964 | Stokes et al. | |
| 3,166,542 A | 1/1965 | Orzechowski et al. | |
| 3,203,762 A | 8/1965 | Carpenter | |
| 3,205,177 A | 9/1965 | Orzechowski et al. | |
| 3,205,178 A | 9/1965 | Orzechowski et al. | |
| 3,212,911 A | 10/1965 | Berstein et al. | |
| 3,322,499 A | 5/1967 | Carpenter et al. | |
| 3,363,980 A | 1/1968 | Krinov | |
| 3,365,274 A | 1/1968 | Carpenter et al. | |
| 3,372,001 A | 3/1968 | Wendell | |
| 3,406,228 A | 10/1968 | Hardy et al. | |
| 3,455,653 A | 7/1969 | Aftandilian | |
| 3,488,204 A | 1/1970 | Jordan et al. | |
| 3,493,342 A | 2/1970 | Weaver et al. | |
| 3,510,291 A | 5/1970 | Brush | |
| 3,510,292 A | 5/1970 | Hardy et al. | |
| 3,607,049 A | 9/1971 | Weaver, Jr. et al. | |
| 3,619,140 A | 11/1971 | Morgan et al. | |
| 3,639,100 A | 2/1972 | Rick | |
| 3,663,283 A | 5/1972 | Herbert et al. | |
| 3,922,335 A | 11/1975 | Jordan et al. | |
| RE28,974 E | 9/1976 | Morgan et al. | |
| 4,023,961 A | 5/1977 | Douglas et al. | |
| 4,145,403 A | 3/1979 | Fey et al. | |
| 4,822,410 A * | 4/1989 | Matovich | 75/345 |
| 4,857,076 A * | 8/1989 | Pearson et al. | 48/86 R |
| 4,879,104 A | 11/1989 | List et al. | |
| 4,937,062 A | 6/1990 | Jordan et al. | |
| 5,075,090 A | 12/1991 | Lewis et al. | |
| 5,152,819 A | 10/1992 | Blackwell et al. | |
| 5,256,389 A * | 10/1993 | Jordan et al. | 423/592.1 |
| 5,340,560 A * | 8/1994 | Rohr et al. | 423/337 |
| 5,447,708 A | 9/1995 | Helble et al. | |
| 5,599,511 A | 2/1997 | Helble et al. | |
| 5,614,472 A | 3/1997 | Riddle et al. | |
| 5,876,683 A | 3/1999 | Glumac et al. | |
| 5,904,762 A * | 5/1999 | Mahmud et al. | 106/475 |
| 5,958,361 A | 9/1999 | Laine et al. | |
| 6,086,841 A | 7/2000 | Lee | |
| 6,110,437 A | 8/2000 | Schall et al. | |
| 6,312,656 B1 * | 11/2001 | Blackwell et al. | 423/337 |
| 6,364,944 B1 | 4/2002 | Mahmud et al. | |
| 6,551,567 B2 | 4/2003 | Konya et al. | |
| 6,565,823 B1 * | 5/2003 | Hawtof et al. | 423/337 |
| 6,602,820 B1 | 8/2003 | Gobel et al. | |
| 6,627,173 B2 | 9/2003 | Hemme et al. | |
| 6,630,084 B1 | 10/2003 | Oda | |
| 6,887,566 B1 * | 5/2005 | Hung et al. | 428/357 |
| 2002/0041963 A1 | 4/2002 | Konya et al. | |
| 2005/0238560 A1 | 10/2005 | Kutsovsky | |

FOREIGN PATENT DOCUMENTS

| | | |
|---|---|---|
| EP | 0 471 139 A2 | 2/1992 |
| JP | 59-223217 A | 12/1984 |
| WO | WO 90/10596 A1 | 9/1990 |
| WO | WO 90/15019 A1 | 12/1990 |
| WO | WO 98/09753 A1 | 3/1998 |
| WO | WO 2004/056461 A2 | 7/2004 |

OTHER PUBLICATIONS

Briesen et al., "Synthesis of $SiO_2$ particles from organometallic precursors," *World Congress on Particle Technology*, 3, 1-6 (1998).

Brunauer et al., "Adsorption of gases in multimolecular layers," *J. Am. Chemical Society*, 60, 309-319 (1938).

Davidson et al., "Kinetics of the thermolysis of octamethylcyclotetrasiloxane in the gas phase," *J.C.S. Faraday Transactions I*, 71, 2260-2265 (1975).

Davidson et al., "Kinetics of the oxidation of octamethylcyclotetrasiloxane in the gas phase," *J.C.S. Faraday Transactions I*, 72, 1088-1095 (1976).

Glassman, *Combustion*, Academic Press, Orlando (1987), pp. 15-27.

Glumac, "Formation and consumption of SiO in powder synthesis flames," *Combustion and Flame*, 125, 702-711 (2001).

Hasegawa et al., "Effect of additive oxides on ultrafine $CeO_2$ particles synthesized by the spray-ICP technique," *J. Mat. Sci. Letters*, 15(18), 1608-1611 (1996).

Hshieh, "Predicting heats of combustion and lower flammability limits of organosilicon compounds," *Fire Mater.*, 23, 79-89 (1999).

Hung et al., "Formation of mixed oxide powders in flames: Part I. $TiO_2$-$SiO_2$," *J. Mater. Res.*, 7(7), 1861-1869 (Jul. 1992).

Ingebo et al., "Drop-size distribution for crosscurrent breakup of liquid jets in airstreams," National Advisory Committee for Aeronautics Technical Note 4087 (1957).

Kammler et al., "Flame synthesis of nanoparticles," *Chem. Eng. Technol.*, 24(6), 583- 596 (2001).

Kammler et al., "Scaling-up the production of nanosized $SiO_2$-particles in a double diffusion flame aerosol reactor," *J. Nanoparticle Res.*, 1, 467-477 (1999).

Kammler et al., "Synthesis of silica-carbon particles in a turbulent $H_2$-air flame aerosol reactor," *AIChE J.*, 47(7), 1533-1543 (Jul. 2001).

Kodas et al., *Aerosol Processing of Materials*, 28-31, Wiley VHC, New York (1999).

Kroschwitz, exec. ed., *Kirk-Othmer Encyclopedia of Chemical Technology*, 4th ed., John Wiley & Sons, New York (1997), pp. 1026-1027.

Mädler et al., "Controlled synthesis of nanostructured particles by flame spray pyrolysis," *J. Aerosol Sci.*, 33, 369-389 (2002).

Sano et al., "Analysis of production process of oxidized metallic powder (preparation of cerium dioxide particles by spray pyrolysis method)," *Proceedings of ICLASS-'97*, vol. 2, 1045-1052 (Aug. 18-22, 1997).

Sanogo et al., "Kinetic studies of the reaction of tetraethoxysilane with oxygen atoms," *J. Electrochem. Soc.*, 144(8), 2919-2923 (Aug. 1997).

Suzuki et al., "Synthesis of ultrafine single-component oxide particles by the spray-ICP technique," *J. Mat. Sci.*, 27(3), 679-684 (1992).

Vallet-Regi et al., "Synthesis and characterization of $CeO_2$ obtained by spray pyrolysis method," *Materials Science Forum* vols. 235-238, 291-296 (1997).

Weiss et al., "Atomization in high velocity airstreams," *ARS J.*, 29(4), 252-259 (1959).

Mädler, *KONA*, 22: 107-120 (2004).

* cited by examiner

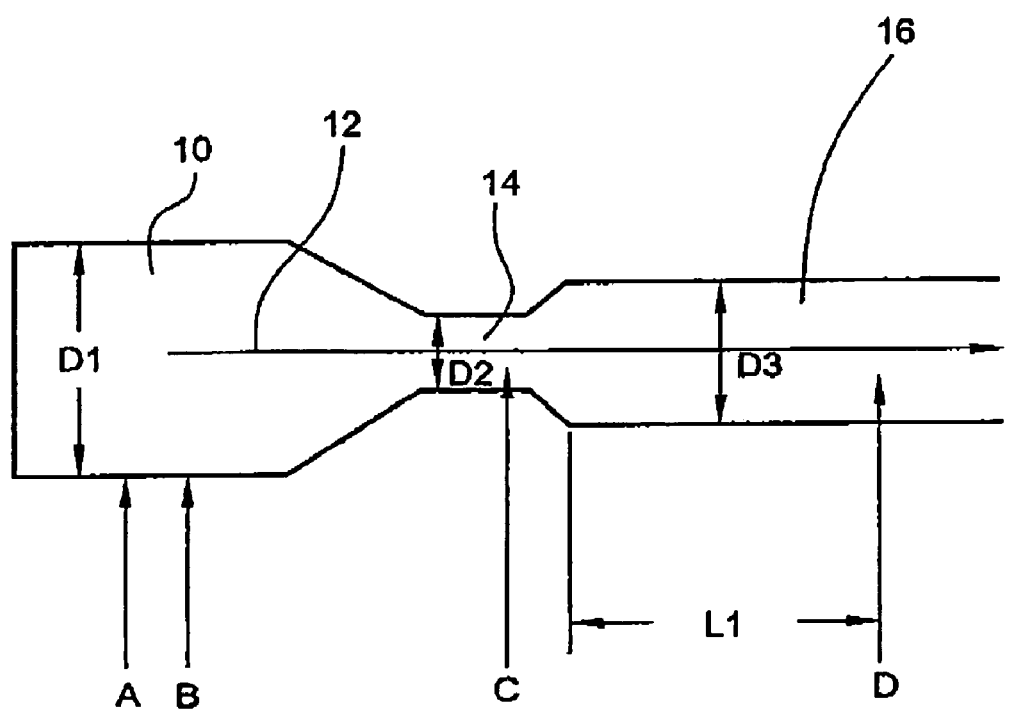

US 7,572,423 B2

FUMED METAL OXIDE PARTICLES AND PROCESS FOR PRODUCING THE SAME

CROSS-REFERENCE TO RELATED APPLICATIONS

This patent application claims the benefit of U.S. Provisional Patent Application No. 60/429,217, filed Nov. 26, 2002.

FIELD OF THE INVENTION

This invention pertains to metal oxide particles and processes for the production thereof.

BACKGROUND OF THE INVENTION

Metal oxide particles have found widespread applications in industry. For example, in the semiconductor industry, metal oxide particles have been used as abrasives in polishing compositions. Metal oxide particles also have been used in the preparation of coating compositions, such as paints, and in the production of ink recording media.

Various methods have been disclosed for the production of metal oxide particles. For example, U.S. Pat. No. 3,322,499 (Carpenter et al.) discloses a method for the production of pyrogenic metal oxide particles by high-temperature oxidation of volatile metal compounds, such as metal halides or oxyhalides. While such processes yield metal oxide particles of satisfactory quality, they often involve expensive post-production treatment steps, such as removing the acid that results from the combustion of the halogenated feedstock.

Thus, a need exists for a process for the production of metal oxide particles that does not involve costly and complicated pre- and post-production treatment steps. A need also exists for metal oxide particles having a relatively small aggregate size and/or a relatively narrow aggregate size distribution. These and other advantages of the invention, as well as additional inventive features, will be apparent from the description of the invention provided herein.

BRIEF SUMMARY OF THE INVENTION

The invention provides a process for producing fumed metal oxide particles comprising providing a stream of a liquid feedstock comprising a volatizable, non-halogenated metal oxide precursor, providing a stream of a combustion gas having a linear velocity sufficient to atomize and combust or pyrolyze the liquid feedstock, injecting the stream of the liquid feedstock into the stream of combustion gas to form a reaction mixture such that the liquid feedstock is atomized and subjected to a sufficient temperature and residence time in the combustion gas stream for fumed metal oxide particles to form before the combustion gas temperature is reduced below the solidifying temperature of the fumed metal oxide particle.

The invention further provides a population or collection of fumed silica particles having a primary particle size d and an aggregate size $D_{circ}$, wherein the average of the primary particle sizes $d_{ave}$, the average of the aggregate sizes $D_{circ\ ave}$, and the geometric standard derivation of the aggregate sizes $\sigma_g$ ($D_{circ}$) satisfy one or both of the following equations:

$$D_{circ\ ave}(\text{nm}) < 52 + 2 \times d_{ave}(\text{nm}) \quad (1)$$

$$\sigma_g(D_{circ}) < 1.44 + 0.011 \times d_{ave}(\text{nm}) \quad (2)$$

BRIEF DESCRIPTION OF THE DRAWINGS

FIG. 1 is a schematic view of a reactor suitable for carrying out the inventive process.

DETAILED DESCRIPTION OF THE INVENTION

The invention provides a process for producing fumed metal oxide particles. The method comprises (a) providing a stream of a liquid feedstock comprising a volatizable, non-halogenated metal oxide precursor, (b) providing a stream of a combustion gas having a linear velocity sufficient to atomize and combust or pyrolyze the liquid feedstock, and (c) injecting the stream of the liquid feedstock into the stream of combustion gas to form a reaction mixture such that the liquid feedstock is atomized and subjected to a sufficient temperature and residence time in the combustion gas stream for fumed metal oxide particles to form before the combustion gas temperature is reduced below the solidifying temperature of the fumed metal oxide particle.

As used herein, the term metal oxide particles refers to discrete particles of metal oxides, which can be represented by the chemical formula $M_xO_y$, wherein M represents a metal and X and Y are independently greater than 1. These particles, typically, are aggregates of smaller primary particles, which are held together by relatively strong cohesive forces. Aggregate metal oxide particles can also form larger agglomerate particles, which are held together by relatively weak cohesive forces.

The liquid feedstock used in the invention comprises a volatizable, non-halogenated metal oxide precursor. As utilized herein, the term "volatizable" refers to a compound that readily converts to a gas or vapor when introduced into the stream of combustion gas. The metal oxide precursors suitable for use in the invention are not particularly limited, and include any metal oxide precursors known to those of skill in the art, provided that the precursors are non-halogenated and are readily volatizable in a stream of combustion gas. Suitable non-halogenated precursors include, but are not limited to, aluminum(III) n-butoxide, aluminum(III) sec-butoxide, aluminum(III) isopropoxide, trimethylaluminum, and titanium isopropoxide, and mixtures thereof. The metal oxide precursor also can be a silicone compound. Suitable silicone compounds include, but are not limited to, (i) silicates such as tetraethoxyorthosilicate (TEOS) and tetramethoxyorthosilicate; (ii) silanes such as alkoxysilanes, alkylalkoxysilanes, and aryl-alkylalkoxysilanes, for example, tetramethoxysilane, tetraethoxysilane, methyltrimethoxysilane, methyltriethoxysilane, dimethyldimethoxysilane, dimethyldiethoxysilane, trimethylmethoxysilane, trimethylethoxysilane, and diethylpropylethoxysilane; (iii) silicone oil; (iv) polysiloxanes and cyclic polysiloxanes, for example, octamethylcyclotetrasiloxane (OMTS), decamethylcyclopentasiloxane, dodecamethylcyclohexasiloxane, hexamethyl-cyclotrisiloxane; (v) silazanes such as hexamethyldisilazane; and mixtures thereof. Preferably, the silicone compound is selected from the group consisting of methyltrimethoxysilane, octamethylcyclotetrasiloxane, and mixtures thereof.

The liquid feedstock also can comprise two or more volatizable, non-halogenated metal oxide precursors. For example, the liquid feedstock can comprise a silicon-containing metal oxide precursor and an aluminum-containing metal oxide precursor, or the liquid feedstock can comprise a silicon-containing metal oxide precursor and a titanium-containing metal oxide precursor. Preferably, the metal oxide precursor comprises a silicone compound and at least one compound selected from the group consisting of aluminum (III) n-butoxide, aluminum(III) sec-butoxide, aluminum(III) isopropoxide, and trimethylaluminum. When the liquid feedstock comprises two or more volatizable, non-halogenated metal oxide precursors, the two or more metal oxide precursors can be present in the liquid feedstock in any suitable amounts. It will be understood that by varying the relative amounts of the metal oxide precursors the chemical composition of the fumed metal oxide particles can be varied.

The liquid feedstock can be formed by any suitable method. The metal oxide precursor can be prepared by mixing the metal oxide precursor with a suitable solvent therefor. Preferably, the solvent does not leave residual contaminants in the formed metal oxide particles upon combustion or pyrolysis of the liquid feedstock. Suitable solvents include, but are not limited to, one or more organic solvents.

The metal oxide precursor can be present in the liquid feedstock in any suitable concentration. Higher metal oxide precursor concentrations generally are preferred to lower metal oxide precursor concentrations in order to maximize fumed metal oxide particle production rates. Metal oxide precursor concentrations that approach saturation in the liquid feedstock are particularly preferred. As will be appreciated by those of ordinary skill in the art, the saturation point of the liquid feedstock will depend upon the particular solvent and metal oxide precursor used, as well as external factors such as pH, temperature, and pressure. Thus, in some preparations, the concentration of the metal oxide precursor in the liquid feedstock typically will be about 20 wt. % or more, preferably about 60 wt. % or more, and more preferably about 80 wt. % or more. Most preferably, the metal oxide precursor is not mixed with a suitable solvent therefore (i.e., the metal oxide precursor is 100 wt. % of the liquid feedstock).

The stream of combustion gas can be formed by any suitable method. Preferably, the stream of combustion gas is established by combustion of a preheated oxidant stream and a liquid or gaseous fuel stream. Typically, the oxidant stream comprises any gaseous oxidant which, when mixed in appropriate proportions with the fuel stream, results in an energetically combustible mixture. Suitable oxidant streams include, but are not limited to, air, oxygen, and mixtures thereof. The oxidant stream can also comprise one, or more substantially non-oxidizing or inert gases, such as nitrogen, carbon dioxide, argon, etc. When the oxidant stream comprises a mixture of at least one oxidant gas and at least one substantially non-oxidizing or inert gas, the total oxidant gas concentration of the mixture is preferably at least about 20 vol. %.

The oxidant stream can be preheated to any suitable temperature. Typically, the oxidant stream is heated to a temperature such that, when mixed with the fuel stream, the resulting mixture can be readily combusted. In other embodiments, the oxidant stream can be heated to a temperature such that the fuel stream immediately combusts when mixed with the oxidant stream.

The fuel stream can comprise one or more of any readily combustible gases, vapors, and/or liquid fuels. Examples of suitable fuels include, but are not limited to, hydrogen ($H_2$), carbon monoxide (CO), methane ($CH_4$), etc. However, it is generally preferred to use fuel streams having a high content of carbon-containing components, such as hydrocarbons. Suitable hydrocarbons include, but are not limited to, natural gas, methane, acetylene, alcohol, kerosene, and mixtures thereof. As used herein, the term "natural gas" refers to a mixture of methane ($CH_4$), ethane ($C_2H_6$), propane ($C_3H_8$), butane ($C_4H_{10}$), and nitrogen. In some forms, natural gas may further comprise relatively small amounts of helium. As utilized herein, the term "kerosene" refers to a mixture of petroleum hydrocarbons, which is obtained during the fractional distillation of petroleum. In another preferred embodiment, the fuel stream comprises hydrogen.

The relative amounts of the oxidant stream and fuel stream used to establish the stream of combustion gas can be varied over a wide range to optimize the temperature and linear velocity of the stream for specific precursors. The relative amounts of oxidant and fuel necessary to produce a stream of combustion gas having a linear velocity sufficient to atomize and pyrolyze or combust the liquid feedstock will depend upon the particular oxidant(s) and fuel(s) being used, as well as the particular feedstock to be atomized and pyrolyzed or combusted. Typically, the mixture of oxidant and fuel can be either fuel rich or fuel lean. As utilized herein, the term "fuel rich" refers to a mixture of fuel and oxidant in which the amount of oxidant present in the mixture is not sufficient to completely oxidize, or combust, the amount of fuel present in the mixture. By way of contrast, the term "fuel lean" refers to a mixture of fuel and oxidant in which the oxidant is present in an amount in excess of that necessary to completely oxidize, or combust, the fuel present in the mixture.

The stream of combustion gas has a linear velocity sufficient to atomize and combust or pyrolyze the liquid feedstock. Typically, the stream of combustion gas will have a linear velocity of at least about Mach 0.2. As utilized herein, the term "Mach" refers to the ratio of the linear velocity of the stream of combustion gas to the velocity of sound in the surrounding medium (i.e., the stream of combustion gas). Those of ordinary skill in the art will recognize that, as the speed of sound is dependent upon the temperature and pressure of the medium through which it travels, the Mach velocity is also dependent upon the temperature and pressure of the surrounding medium. Thus, the velocity of the stream of combustion gas, expressed in terms of Mach number, will depend upon the temperature and pressure of the combustion gas. Furthermore, the linear velocity necessary to atomize and pyrolyze or combust the liquid feedstock will depend upon the particular feedstock(s) being used. For example, the optimum linear velocity for the atomization and combustion of a methyltrimethoxysilane feedstock may be different from the optimum linear velocity for the atomization and combustion of an octamethylcyclotetrasiloxane feedstock.

The stream of combustion gas can have any suitable temperature. Typically, the temperature of the stream of combustion gas will be about 2200 K to about 3000 K. The temperature of the stream of combustion gas can be measured by methods known in the art, such as by thermocouples as described in Hung et al., *J. Mater. Res.*, 7, 1861-1869 (July 1992).

The oxidant stream and the fuel stream can be combined in any suitable apparatus to render the stream of combustion gas. Typically, the oxidant stream and fuel stream are combined and combusted in a combustion chamber, which is connected to a reaction zone where the liquid feedstock is injected into the stream of combustion gas. In one embodiment, the combustion chamber comprises an enclosure wherein the internal cross-sectional area of the enclosure decreases along the path of the combustion gas. In this embodiment, the combustion gas travels through the enclosure and enters a reaction zone having an internal cross-sectional area greater than the internal cross-sectional area of the combustion chamber.

The liquid feedstock can be introduced at any suitable point in the stream of combustion gas. However, the feedstock must be introduced into the stream of combustion gas at a point which ensures that the feedstock is subject to a temperature, linear velocity, and residence time sufficient to atomize and convert the feedstock, either by combustion or pyrolysis, to the desired metal oxide. As noted above, the necessary temperature, linear velocity, and residence time will depend upon the particular feedstock being used, and, accordingly, the necessary point of introduction may vary depending upon the particular feedstock.

The stream of the liquid feedstock can be injected into the combustion gas stream by any suitable method. Typically, the stream of the feedstock is injected into the combustion gas through at least one nozzle. The type of nozzle suitable for use in the invention is not particularly limited. Preferably, the nozzle is a single fluid or a bi-fluid nozzle. As utilized herein, the term "single fluid" refers to a nozzle in which a single fluid is introduced into and emanates from the nozzle, and the term "bi-fluid nozzle" refers to a nozzle in which two fluids are introduced into the nozzle, mixed, and the mixture then emanates from the nozzle. Preferably, several (e.g., two or more, or three or more, or four or more) nozzles are used to inject the stream of the liquid feedstock into the stream of combustion gas, thereby ensuring that the liquid feedstock is rapidly and evenly mixed with the combustion gas. Furthermore, when several nozzles are used, one or more of the nozzles is preferably located downstream (i.e., along the path of the combustion gas) of the other nozzle(s).

When at least one single fluid nozzle is used, the liquid feedstock can be atomized in two ways. First, the liquid feedstock can be fed to the nozzle under pressure, which ensures that the stream of the liquid feedstock exits the nozzle with sufficient force to atomize the liquid feedstock. Second, the stream of the liquid feedstock can be injected directly into the stream of combustion gas, in which case, the force of the combustion gas stream atomizes the liquid feedstock. Typically, when a bi-fluid nozzle is used, the liquid feedstock is primarily atomized using a pressurized fluid, such as steam or air, and further atomized by the force of the stream of combustion gas.

In certain embodiments, one or more additional liquid feedstocks can be introduced into the stream of combustion gas. The additional feedstock(s) can be introduced into the stream of combustion gas at the same point as the first feedstock, or the additional feedstock(s) can be introduced at one or more points downstream of the point where the first feedstock is introduced into the stream of combustion gas. When multiple feedstocks are introduced into the stream of combustion gas, each feedstock can comprise the same precursor, or each feedstock can comprise a different precursor.

In the above-described process, the metal oxide particles can be formed in one of two ways. First, the precursor contained in the liquid feedstock can be combusted to form the corresponding metal oxide particle. Second, the precursor contained in the liquid feedstock can be pyrolyzed to form the corresponding metal oxide particle. As utilized herein, the term "pyrolysis" refers to the thermal decomposition of a carbonaceous compound, such as a silicon-containing feedstock.

When the metal oxide particles are formed by pyrolysis, the reaction mixture can be contacted with additional components to ensure that the metal oxide precursor has been oxidized. These additional components can be any suitable chemical that increases the oxidation of the metal oxide precursor in the absence of oxygen. Suitable chemicals include, but are not limited to, $CO_2$ and $H_2O$. In certain embodiments, the fuel to oxidant ratio should be maintained at or below a level low enough to ensure that carbon black does not form in the stream of combustion gas. This level is commonly referred to as the "critical equivalence ratio," and, for the feedstocks suitable for use in the invention, it is equal to approximately 1.7. The equivalence ratio is defined as the ratio of the fuels to oxidizers present in a system divided by the stoichiometric ratio of fuels to oxidizers required for complete combustion of the same system. See I. Glassman, "Combustion," AP, 1987.

After the solid metal oxide particles have formed, the reaction can be arrested by quenching the reaction mixture (i.e., the liquid feedstock and the combustion gas). Typically, the reaction mixture is quenched by spraying a quenching agent into the stream of newly formed solid metal oxide particles. Any suitable quenching agent can be used to quench the reaction mixture. Suitable quenching agents include, but are not limited to, air, steam, carbon dioxide, and water. Alternatively, or in addition, when the liquid feedstock is injected into the stream of combustion gas inside a reactor having walls, the reaction mixture can be quenched by heat transfer to the walls of the reactor. The quench serves to cool the metal oxide particles and reduce the temperature of the gaseous stream, thereby decreasing the reaction rate. Optionally, quenching can be staged, or take place at several points in the reactor.

After the reaction mixture is quenched, the cooled gases and metal oxide particles pass downstream into any conventional cooling and separating means whereby the metal oxide particles and any co-produced carbon black are recovered. The separation of the metal oxide particles from the gas stream is readily accomplished by conventional means such as a precipitator, cyclone separator, bag filter, or other means known to those skilled in the art.

The process of the invention can be carried out in any suitable apparatus. Preferably, the process is carried out in a reactor such as that depicted in FIG. 1. In particular, the reactor depicted in FIG. 1 incorporates a combustion chamber 10 having an internal diameter D1 in which the stream of combustion gas is established by injection, for example, of gases A and B (e.g., air and hydrogen). The internal diameter of the combustion chamber 10 decreases along the path 12 of the combustion gas stream until it reaches a constricted portion 14 of the reactor having an internal diameter D2 (which is smaller than D1). Preferably, the liquid feedstock C is injected into the stream of combustion gas at one or more points in the constricted portion 14 of the reactor. While not wishing to be bound to any particular theory, it is believed that injecting the liquid feedstock into the stream of combustion gas in the constricted portion of the reactor ensures that the stream of combustion gas has a velocity and temperature sufficient to atomize and combust or pyrolyze the liquid feedstock. The internal diameter of the reactor then increases along the path 12 of the combustion gas and liquid feedstock streams until it reaches an enlarged portion 16 having an internal diameter D3 (which is larger than the diameter D2), in which the fumed metal oxide particles form, and, optionally, the reaction mixture is quenched by injection of quenching agent D (e.g., water).

The temperature of the stream of combustion gas determines the surface area of the metal oxide particles. The surface area of the metal oxide particles generally is related to the size of the primary particles. Preferred metal oxide particles have a surface area, as calculated from the method of S. Brunauer, P. H. Emmet, and I. Teller, *J. Am. Chemical Society*, 60, 309 (1938), and commonly referred to as BET, of at least about 10 $m^2/g$, preferably at least about 15 $m^2/g$, more preferably at least about 20 $m^2/g$, and most preferably at least about 25 $m^2/g$. The metal oxide particles typically have a BET surface area of less than about 500 $m^2/g$, preferably less than about 475 $m^2/g$, more preferably less than about 450 $m^2/g$, and most preferably less than about 400 $m^2/g$.

The process of the invention can advantageously be used to produce particles of any suitable metal oxide. Suitable metal oxides include, but are not limited to, alumina, zirconia, ceria, yttria, silica, titania, baria, niobia, rubidia, strontia, and calcia. The process of the invention also can be used to produce fumed metal oxide particles comprising two or more metal oxides (e.g., fumed metal oxide particles comprising silica and alumina).

The invention further provides a population or collection of (e.g., a composition comprising, consisting essentially of, or consisting of) fumed silica particles having a primary particle size d and an aggregate size $D_{circ}$, wherein the average of the primary particle sizes $d_{ave}$, the average of the aggregate sizes $D_{circ\,ave}$, and the geometric standard derivation of the aggregate sizes $\sigma_g\,(D_{circ})$ satisfy one or both of the following equations:

$$D_{circ\,ave}(nm) < 52 + 2 \times d_{ave}(nm) \quad (1)$$

$$\sigma_g(D_{circ}) < 1.44 + 0.011 \times d_{ave}(nm) \quad (2)$$

The average of the primary particle sizes, $d_{ave}$, is related to the BET surface area, SA, of the fumed silica particles and can be calculated using the following formula:

$$d_{ave}(nm) = 1941/SA(m^2/g).$$

The aggregate size, $D_{circ}$, is defined as the diameter of a circle having the same area as the aggregate, A, which can be measured by any suitable method, such as TEM image analysis according to ASTM Standard D3849. Once the area of the aggregates, A, has been determined, the aggregate size, $D_{circ}$, can be calculated using the following equation:

$$D_{circ} = \sqrt{4A/\pi}.$$

As utilized herein, the geometric standard deviation of the aggregate sizes, $\sigma_g\,(D_{circ})$, is the geometric standard deviation of the aggregate sizes, $D_{circ}$, for the fumed silica particles of the population, collection, or composition as described below (e.g., about 2000 or more aggregates) and represents the aggregate size distribution for the fumed silica particles. The $D_{circ\,ave}$ values for the fumed silica particles are geometric number averages. The geometric number averages as well as the geometric standard deviation can be calculated by any suitable method, such as the method described in T. Kodas and M. Hampden-Smith, *Aerosol Processing of Materials*, 28-31 (John Wiley & Sons 1999).

The population or collection of, or the composition comprising, the fumed silica particles can comprise any suitable number of fumed silica particles. For example, the population, collection, or composition can comprise about 2000 or more aggregates, about 5000 or more aggregates, or even about 10,000 or more aggregates, of the fumed silica particles. The population, collection, or composition also can comprise about 10 g or more, about 100 g or more, or about 1 kg or more of the fumed silica particles.

The metal oxide particles of the invention are advantageously suited for a variety of applications. For instance, the metal oxide particles can be used as an abrasive in chemical-mechanical polishing processes. While not wishing to be bound to any theory, it is believed that the smaller aggregate size and/or narrow aggregate size distribution of the metal oxide particles reduces, at least in part, the occurrence of surface defects caused by the polishing processes. The metal oxide particles also can be used in the preparation of coating compositions, such as paints. These coating compositions also can be used to coat a substrate, such as a polymer film or paper, to produce ink recording media.

The following examples further illustrate the invention but, of course, should not be construed as in any way limiting its scope.

EXAMPLES 1-4

These examples demonstrate the process of producing fumed metal oxide particles according to the invention. In particular, these examples demonstrate four processes used to produce fumed silica particles having different surface areas. The following processes were carried out using a pilot scale reactor as described above and as depicted in FIG. 1. The approximate dimensions of the pilot scale reactor, with reference to FIG. 1, were as follows: D1=18.4 cm, D2=9.7 cm, D3=69 cm, and L1=213 cm. The liquid feedstock was a commercially available octamethylcyclotetrasiloxane (OMTS), and the stream of combustion gas was established by combusting a mixture of air and natural gas. The quantities of air, natural gas, and OMTS utilized in each of the processes are set forth in Table 1. The liquid feedstock (i.e., OMTS) was injected into the stream of combustion gas at the constricted portion 14 of the reactor (i.e., the portion with diameter D2 in FIG. 1), and the reaction mixture was quenched using water (which was introduced into the reactor at position D in FIG. 1).

TABLE 1

Quantities of air, natural gas, and OMTS.

| | EXAMPLE 1 | EXAMPLE 2 | EXAMPLE 3 | EXAMPLE 4 |
|---|---|---|---|---|
| Air (Nm³/h) | 1605 | 1605 | 1605 | 1605 |
| Natural Gas (Nm³/h) | 101 | 215 | 181 | 151 |
| OMTS (kg/h) | 50 | 150 | 100 | 100 |

The surface area of the fumed silica particles produced by each of the processes was measured in accordance with the BET procedure. The average surface area of the fumed silica particles resulting from each of the processes is set forth in Table 2.

TABLE 2

Average BET surface area for the fumed silica particles.

| | EXAMPLE 1 | EXAMPLE 2 | EXAMPLE 3 | EXAMPLE 4 |
|---|---|---|---|---|
| BET Surface Area (m²/g) | 258 | 173 | 82 | 46 |

As demonstrated by these results, the process of the invention can be used to produce fumed metal oxide particles from a non-halogenated metal oxide precursor. Moreover, the process of the invention can be used to produce fumed metal oxide particles having a wide range of surface areas.

EXAMPLE 5

This example demonstrates the unique particle size features of the fumed silica particles of the invention. The fumed silica particles of Examples 1-4 were analyzed in accordance with the methods described herein to determine the primary particle sizes d and the aggregate sizes $D_{circ}$ for 2000 aggregates from each sample of the fumed silica particles (i.e., the silica particles produced by each of Examples 1-4). The average of the primary particle sizes $d_{ave}$, the average of the aggregate sizes $D_{circ\,ave}$, and the geometric standard deviation of the aggregate sizes $\sigma_g\,(D_{circ})$ then were calculated. In particular, the average of the primary particle sizes $d_{ave}$ of the fumed silica particles was determined using the BET surface area (SA) measurements and the equation: $d_{ave}$ (nm)=1941/SA (m²/g). Aggregate size $D_{circ}$ was determined using TEM image analysis to measure the area, A, of each aggregate and calculating the aggregate size $D_{circ}$ using the equation $D_{circ}$= $\sqrt{4A/\pi}$. From these $D_{circ}$ determinations, the geometric number average of the aggregate sizes $D_{circ\ ave}$ and the geometric standard deviation of the aggregate sizes $\sigma_g$ ($D_{circ}$) were calculated for each sample of the fumed silica particles (i.e., the silica particles produced by each of Examples 1-4). The average of the primary particle sizes $d_{ave}$, the average of the aggregate sizes $D_{circ\ ave}$, and the geometric standard deviation of the aggregate sizes (i.e., the aggregate size distribution) $\sigma_g$ ($D_{circ}$) are set forth in Table 3 for each sample of flumed silica particles.

TABLE 3

Primary particle size, aggregate size, and aggregate size distribution measurements for the fumed silica particles.

| | EXAMPLE 1 | EXAMPLE 2 | EXAMPLE 3 | EXAMPLE 4 |
|---|---|---|---|---|
| $d_{ave}$ (nm) | 7.5 | 11.2 | 23.7 | 42.2 |
| $D_{circ\ ave}$ (nm) | 70 | 67 | 68 | 101 |
| $\sigma_g$ ($D_{circ}$) | 1.55 | 1.62 | 1.6 | 1.56 |

As demonstrated by these results, the average of the primary particle sizes $d_{ave}$, the average of the aggregate sizes $D_{circ\ ave}$, and the geometric standard deviation of the aggregate sizes $\sigma_g$ ($D_{circ}$) of the silica particles of Example 1 do not satisfy either of the following equations, while those same physical characteristics of the silica particles of Examples 2-4 satisfy one or both of the following equations:

$$D_{circ\ ave}(nm) < 52 + 2 \times d_{ave}(nm) \quad (1)$$

$$\sigma_g(D_{circ}) < 1.44 + 0.011 \times d_{ave}(nm) \quad (2)$$

In particular, while the fumed silica particles of Example 1 do not satisfy equation (1) or (2), the fumed silica particles of Examples 2, 3, and 4 satisfy equation (1), and the fumed silica particles of Examples 3 and 4 satisfy equation (2).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process for producing fumed metal oxide particles comprising:
    (a) providing a reactor comprising a combustion chamber having one or more inlets and an outlet,
    (b) providing one or more streams of an oxidant and a liquid or gaseous fuel and delivering the oxidant and liquid or gaseous fuel via the one or more inlets to the combustion chamber,
    (c) combusting the oxidant and liquid or gaseous fuel in the combustion chamber to form a stream of combustion gas which flows out of the combustion chamber via the outlet,
    (d) providing a stream of a liquid feedstock comprising a volatizable non-halogenated metal oxide precursor and injecting the stream of the liquid feedstock into the stream of combustion gas to thereby atomize the liquid feedstock within the stream of combustion gas and form a reaction mixture comprising the combustion gas and the atomized liquid feedstock,
    (e) subjecting the atomized liquid feedstock to a sufficient temperature and residence time in the stream of combustion gas for the liquid feedstock to combust or pyrolyze and thereby be converted to fumed metal oxide particles,
    (f) reducing the temperature of the stream of combustion gas below the solidifying temperature of the fumed metal oxide particles, and recovering the fumed metal oxide particles.

2. The process of claim 1 further comprising quenching the reaction mixture.

3. The process of claim 2, wherein the reaction mixture is quenched by air.

4. The process of claim 2, wherein the reaction mixture is quenched by steam.

5. The process of claim 2, wherein the reaction mixture is quenched by water.

6. The process of claim 2, wherein the stream of the liquid feedstock is injected into the stream of combustion gas inside a reactor having walls and the reaction mixture is quenched by heat transfer to the walls of the reactor.

7. The process of claim 1, wherein the metal oxide precursor is a silicon-containing compound.

8. The process of claim 7, wherein the silicon-containing compound is selected from the group consisting of silicates, silanes, polysiloxanes, cyclic polysiloxanes, silazanes, and mixtures thereof.

9. The process of claim 8, wherein the silicon-containing compound is selected from the group consisting of tetraethoxyorthosilicate, tetramethoxyorthosilicate, tetramethoxysilane, tetraethoxysilane, methyltriethoxysilane, dimethyldimethoxysilane, dimethyldiethoxysilane, trimethylmethoxysilane, trimethylethoxysilane, diethylpropylethoxysilane, silicone oil, octamethylcyclotetrasiloxane, decamethylcyclopentasiloxane, dodecamethylcyclohexasiloxane, hexamethylcyclotrisiloxane, hexamethyldisilazane, and mixtures thereof.

10. The process of claim 8, wherein the silicon-containing compound is selected from the group consisting of methyltrimethoxysilane, octamethylcyclotetrasiloxane, and mixtures thereof.

11. The process of claim 1, wherein the metal oxide precursor is selected from the group consisting of aluminum(III) n-butoxide, aluminum(III) sec-butoxide, aluminum(III) isopropoxide, trimethylaluminum, and mixtures thereof.

12. The process of claim 1, wherein the liquid feedstock comprises a silicon-containing compound and at least one compound selected from the group consisting of aluminum (III) n-butoxide, aluminum(III) sec-butoxide, aluminum(III) isopropoxide, and trimethylaluminum.

13. The process of claim 1, wherein the oxidant stream is heated prior to combustion with the liquid or gaseous fuel stream.

14. The process of claim 1, wherein the oxidant stream is selected from the group consisting of air, oxygen, and mixtures thereof.

15. The process of claim 1, wherein the fuel stream comprises a hydrocarbon.

16. The process of claim 15, wherein the hydrocarbon fuel stream is selected from the group consisting of natural gas, methane, acetylene, alcohol, kerosene, and mixtures thereof.

17. The process of claim 1, wherein the fuel stream comprises hydrogen.

18. The process of claim 1, wherein the stream of the liquid feedstock is injected into the stream of combustion gas through at least one nozzle.

19. The process of claim 18, wherein the nozzle is a single fluid nozzle.

20. The process of claim 18, wherein the nozzle is a bi-fluid nozzle.

21. The process of claim 18, wherein the liquid feedstock is injected into the stream of combustion gas through two or more nozzles.

22. The process of claim 21, wherein at least one of the nozzles is located downstream of the other nozzle.

23. The process of claim 1, wherein the metal oxide particles are formed by pyrolysis.

24. The process of claim 23, wherein the reaction mixture is contacted with $CO_2$ or $H_2O$ to increase oxidation prior to the reduction of the combustion gas temperature below the solidifying temperature of the fumed metal oxide particle.

25. A composition comprising about 2000 or more fumed silica aggregates having a primary particle size d and an aggregate size $D_{circ}$, wherein the average of the primary particle sizes $d_{ave}$, the average of the aggregate sizes $D_{circ\,ave}$, and the geometric standard deviation of the aggregate sizes $\sigma_g (D_{circ})$ satisfy one or both of the following equations:

$$D_{circ\,ave}\,(nm) < 52 + 2 \times d_{ave}\,(nm) \qquad (1)$$

$$\sigma_g(D_{circ}) < 1.44 + 0.011 \times d_{ave}\,(nm) \qquad (2)$$

26. The composition of claim 25, wherein the fumed silica aggregates have a surface area SA, and the average of the primary particle sizes $d_{ave}$ is calculated from the surface area SA according to the following equation:

$$d_{ave}\,(nm) = 1941/SA\,(m^2/g).$$

27. The composition of claim 26, wherein equation (1) is satisfied.

28. The composition of claim 26, wherein equation (2) is satisfied.

29. The composition of claim 26, wherein both equations (1) and (2) are satisfied.

30. The composition of claim 25, wherein the composition comprises about 5000 or more fumed silica aggregates.

* * * * *